US012676682B2

(12) United States Patent
Lee et al.

(10) Patent No.: US 12,676,682 B2
(45) Date of Patent: Jul. 7, 2026

(54) INTERFERENCE HUNTING BASED ON HIT RATES OF RF SIGNAL FREQUENCIES

(71) Applicant: VIAVI SOLUTIONS INC., Chandler, AZ (US)

(72) Inventors: Seung-Cheol Lee, Seoul (KR); Sung-Hwa Im, Seoul (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 365 days.

(21) Appl. No.: 18/456,937

(22) Filed: Aug. 28, 2023

(65) Prior Publication Data

US 2025/0080248 A1     Mar. 6, 2025

(51) Int. Cl.
*H04B 17/18* (2015.01)
*H04B 17/10* (2015.01)
*H04B 17/345* (2015.01)

(52) U.S. Cl.
CPC ........... *H04B 17/18* (2015.01); *H04B 17/102* (2015.01); *H04B 17/345* (2015.01)

(58) Field of Classification Search
CPC ..... H04B 17/18; H04B 17/102; H04B 17/345
See application file for complete search history.

(56) References Cited

U.S. PATENT DOCUMENTS

2010/0254267 A1*  10/2010  Blackwell ............... H04L 43/18
                                                            370/241
2012/0134280 A1    5/2012  Rotvold et al.
2022/0109498 A1*   4/2022  Vaez-Ghaemi ...... H04B 10/071
2022/0201694 A1    6/2022  Amer

OTHER PUBLICATIONS

European Patent Office, "The extended European search report" for Application No. EP24189705.7, dated Jan. 15, 2025, 8 pages.

* cited by examiner

*Primary Examiner* — Duc C Ho
(74) *Attorney, Agent, or Firm* — Mannava & Kang, P.C.

(57) ABSTRACT

According to examples, a test instrument may include a radio frequency (RF) receiver to receive RF signals across a range of frequencies, a persistent spectrum analyzer to determine signal strengths of the RF signals across the range of frequencies, and a processing circuit. The processing circuit may determine respective hit rates of the RF signals from the determined signal strengths of the RF signals, detect that a certain RF signal of the RF signals is an interference signal based on the respective hit rates of the RF signals, and output the frequency of the detected interference signal. The use of the hit rates may enable identification of interference signals have relatively low signal power levels.

20 Claims, 7 Drawing Sheets

700

COLLECT RF SIGNALS ACROSS A RANGE OF
FREQUENCIES
702

DETERMINE SIGNAL STRENGTHS OF THE RF
SIGNALS
704

DETERMINE RESPECTIVE HIT RATES OF THE RF
SIGNALS
706

DETECT THAT A CERTAIN RF SIGNAL IS AN
INTERFERENCE SIGNAL
708

CAUSE THE FREQUENCY OF THE DETECTED
INTERFERENCE SIGNAL TO BE DISPLAYED
710

INTERFERENCE HUNTING BASED ON HIT RATES OF RF SIGNAL FREQUENCIES

TECHNICAL FIELD

The disclosure relates generally to radio frequency interference (RFI) hunting and particularly, to detecting RFI based on detected hit rates of RF signals across a range of frequencies.

BACKGROUND

In recent years, wireless communication systems have become integral to various industries, including telecommunications, broadcasting, and Internet of Things (IoT). Wireless communication systems often rely on efficient transmission and reception of electromagnetic signals within designated frequency bands to accurate communicate and receive data. The ever-increasing number of wireless electronic devices and networks has led to a significant rise in radio frequency interference.

Radio frequency interference may refer to any unwanted electromagnetic radiation that disrupts or affects the quality of the intended signal transmission or reception. The interference may be caused by any of numerous sources, such as electrical equipment, wireless devices operating on conflicting frequencies, environmental factors, and intentional or unintentional jamming. The presence of such interference may severely degrade the performance of wireless communication systems, leading to reduced data throughput, dropped calls, or even complete loss of connectivity.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
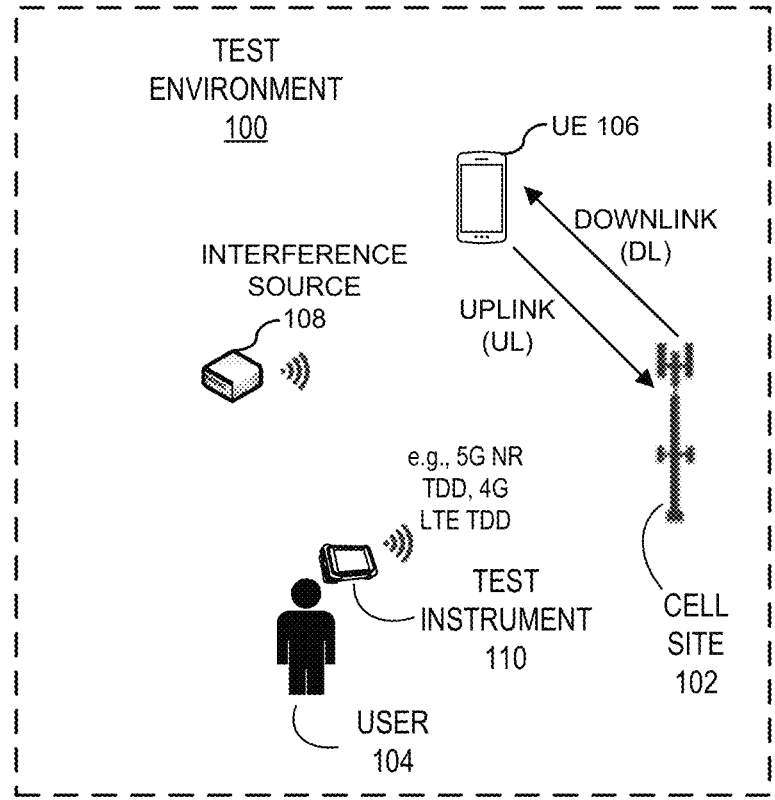
FIG. 1 illustrates a test environment in which a test instrument may be employed to perform interference signal detection, according to an example of the present disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

According to an example of the present disclosure, a test instrument may perform radio frequency interference (RFI) testing (or hunting). RFI may be defined as the effect of unwanted energy from emissions, radiation, conduction, or induction upon the reception of a radio communication system. The test instrument disclosed herein may perform interference testing to detect interference (or interference signals), e.g., RFI. Particularly, for instance, the test instrument disclosed herein may detect interference in channels used in time division duplex (TDD) technologies, e.g., 4G LTE TDD, 5G NR TDD, and/or other TDD technologies. In addition or alternatively, the test instrument disclosed herein may detect interference in channels used in frequency division duplex (FDD) technologies, e.g., microwave links, millimeter wave links, 4G/LTE networks, and/or other FDD technologies.

In some examples, the test instrument disclosed herein may receive RF signals across a range of frequencies and may determine respective hit rates of the RF signals. Particularly, the test instrument may include a processing circuit that may determine the respective hit rates of the RF signals based on signal strengths of the RF signals. A hit rate of a RF signal may be defined as a hit count (number of hits) per a total number of iterations.

In addition, the processing circuit may detect that a certain RF signal is an interference signal based on the respective hit rates of the RF signals (or may detect that multiple RF signals are interference signals). As discussed herein, the processing circuit may detect that a certain RF signal is an interference signal based on the hit rate of the certain RF signal exceeding a predetermined threshold from a baseline. The predetermined threshold and the baseline may be determined based on historical data, may be user-defined, may be determined through application of artificial intelligence techniques on past data, and/or the like. In addition, the baseline may be based on the hit rates of RF signals that are within a certain span of the certain RF signal, e.g., neighboring RF signal frequencies of the certain RF signal frequency.

The processing circuit may also identify a frequency of the detected interference signal and may output the identified frequency of the detected interference signal. For instance, the test instrument may include a display and the processing circuit may cause the frequency of the detected interference signal to be displayed on the display. By way of example, the processing circuit may cause spectrum data corresponding to the detected interference signal and the determined hit rates of the RF signals to be displayed on the display. The processing circuit may also determine a signal power level of the detected interference signal to be determined and caused to be displayed on the display. Furthermore, the test instrument may perform additional signal analysis to determine a location of a source of the interference signal so that the interference source may be resolved or removed.

Through implementation of the features of the present disclosure, interference signals may be detected and rectified. Particularly, the features of the present disclosure may enable interference signals having relatively low power levels, e.g., sufficiently low power levels that may prevent detection of the interference signals through conventional detection techniques, to be detected. By detecting and rectifying interference issues, greater call success rates, decreased dropped calls, increased battery life, increased voice quality, and increased data throughput may be achieved. As a result, superior user experience may be maintained throughout a cellular network.

With reference first to FIG. 1, there is illustrated a test environment 100 in which a test instrument 110 may be employed to perform interference signal detection, according to an example of the present disclosure. It should be understood that the test environment 100 and the test instrument 110 may include additional features and that some of the features described herein may be removed and/or modified without departing from the scopes of the test environment 100 and/or the test instrument 110.

The test environment 100 may include a cell site 102, which may include a cell tower or cellular base station having antennas and electronic communications equipment to support cellular mobile device communication in a TDD technology. In addition or alternatively, the cell site 102 may have antennas and electronic communications equipment to support cellular mobile device communication in a FDD technology. The test environment 100 may be based on the cell size of the cell site 102. The antennas and equipment are typically placed in connection with a radio mast or tower, and the equipment generally connects cell site air interfaces to wireline networks, which may include fiber optic cables and/or coaxial cables. Although not shown, the cell site 102 may be connected to a backhaul via a radio access network (RAN) and the backhaul may be connected to an Evolved Packet Core (EPC). According to examples, the test instrument 110 may perform interference hunting to detect interference signals that may, for instance, degrade the quality of experience of a customer of a cellular service provider utilizing a TDD or FDD technology. 4G LTE TDD and 5G NR TDD are some examples of commonly used TDD technologies. Microwave links, millimeter wave links, and 4G/LTE networks are some examples of commonly used FDD technologies.

A customer of a cellular service provider may use a user equipment (UE) 106 for communicating with the cell site 102 in the TDD technology. The communications include uplink (UL) and downlink (DL) transmissions supported by the cell site 102. The UE 106 may be a smartphone, a tablet computer, a laptop computer, or other wireless device. A user 104, such as a cellular service provider technician, may use the test instrument 110 to perform the interference testing. In an example use case, the user 104 may use the test instrument 110 to perform interference testing when the cell site 102 is being installed, such as to ensure proper operation of the cell site 102 with the UE 106. In another example use case, after installation, customers of the cellular service provider may be experiencing degraded service, and the user 104 may use the test instrument 110 to perform interference testing to detect and resolve interference that may be causing service issues.

In an example, an interference source 108 may be generating RF signals that interfere with the uplink or downlink communications of the UE 106. The user 104 may use the test instrument 110 to detect the interference signals generated by the interference source 108 and/or other interference sources 108 through implementation of features disclosed herein. In some examples, the user 104 may use the test instrument 110 to perform further analysis to determine a geographic location of the interference source 108 within the test environment 100.

Figure 2:
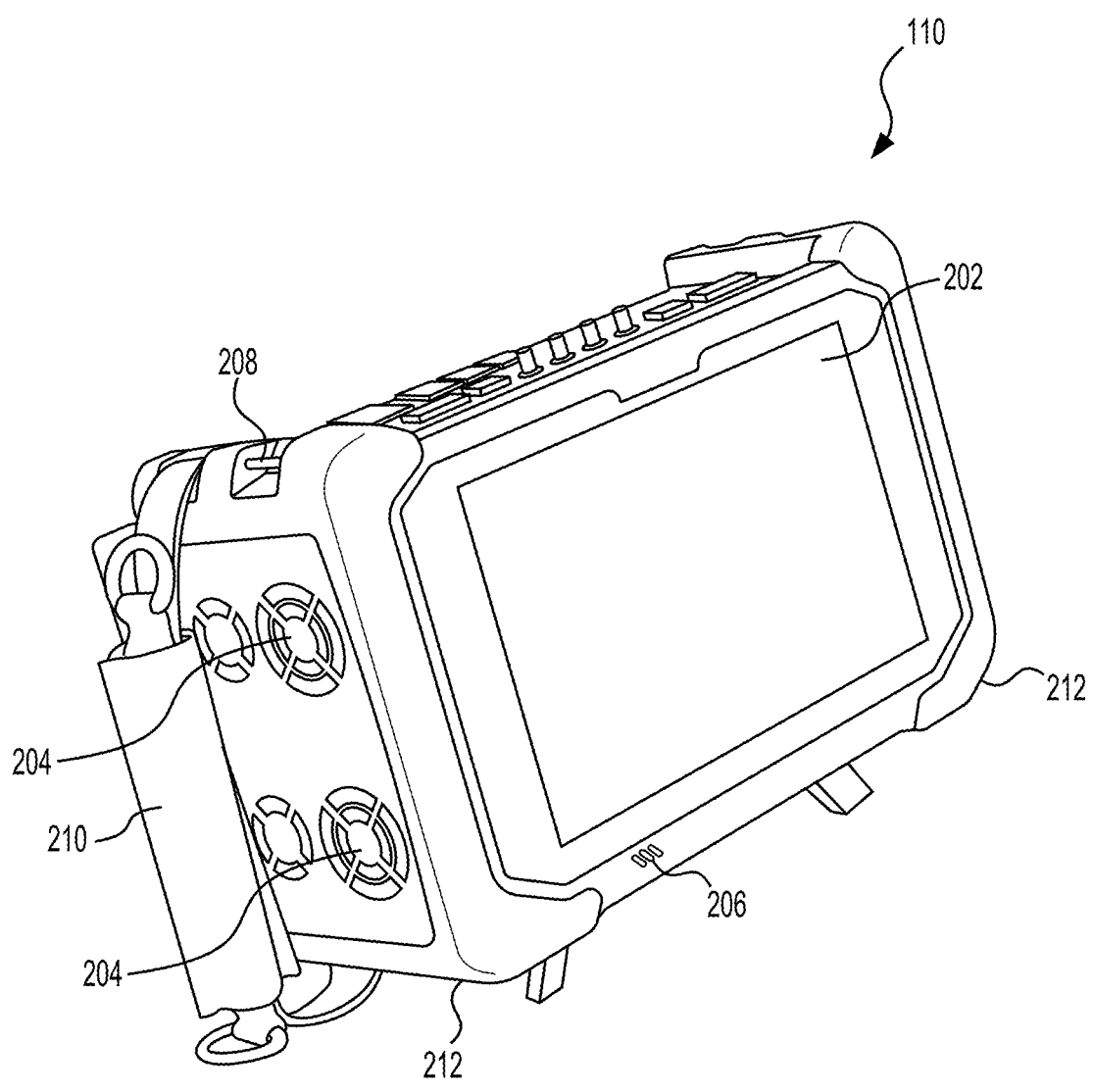
FIG. 2 illustrates a front perspective view of a test instrument for performing tests and measurements, according to an example of the present disclosure.

FIG. 2 illustrates a front perspective view of a test instrument 110 for performing tests and measurements, according to an example of the present disclosure. As shown, the test instrument 110 may be a hand-held tool and may be equivalent to the test instrument 110 shown and discussed herein with respect to FIG. 1. The test instrument 110 may be employed for cell site 102 installation, testing, measurement, and maintenance. For instance, the test instrument 110 may be employed for RFI detection or hunting as discussed herein.

According to examples, the test instrument 110 may include a display 202 that provides user control and information. The display 202 may be a touch screen, e.g., liquid crystal display (LCD) touchscreen. The test instrument 110 may also provide user information including: a listing of jobs, a listing of reports to be compiled, a compilation of executed test results in a test report or test reports, an interface control with a work station or server, and/or the like, on the display 202.

According to the illustrated example of FIG. 2, the test instrument 110 may include ventilation ports 204 provided to the outer structure of the test instrument 110 to facilitate internal cooling of components by way of an internal cooling unit. The test instrument 110 may also include a loudspeaker 206 that provides audio information and support structures 208 for attachment of a support strap 210. According to an example, the support structures 208 are metal pins permanently secured to the structure of the test instrument 110. The test instrument 110 may further include elastomeric bumpers 212 to provide impact protection.

Figure 3:
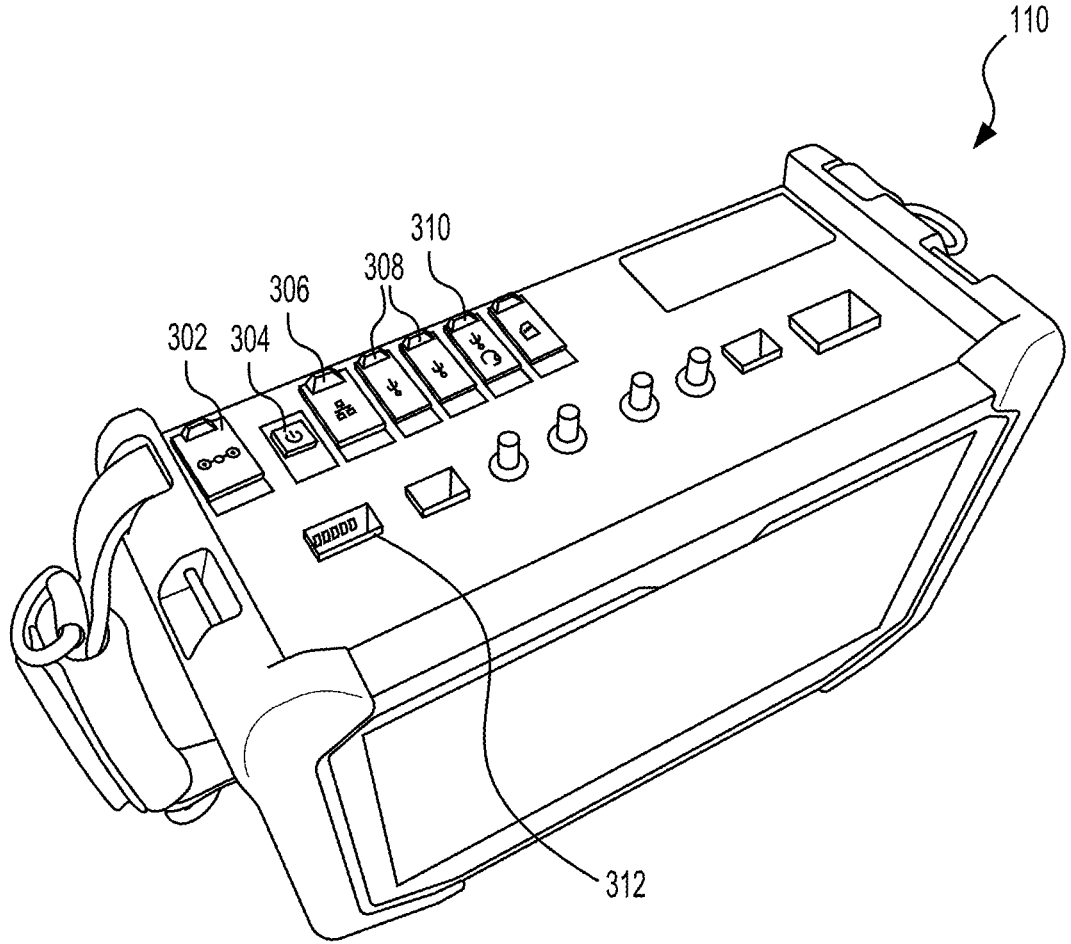
FIG. 3 illustrates a top perspective view of the test instrument depicted in FIG. 2, in accordance with an example of the present disclosure.

FIG. 3 illustrates a top perspective view of the test instrument 110 depicted in FIG. 2, according to an example of the present disclosure. In some examples, the test instrument 110 may include a plurality of elements that may be used for cell site installation, testing, measurement, and maintenance. As shown, the test instrument 110 may include a DC input 302 configured to receive DC power for the test instrument 110 from an external power supply and a power button 304 that a user may depress to power the test instrument 110 on and off.

The test instrument 110 may also include an Ethernet port 306, which may be an RJ-45 jack to provide 10/100/1000-baseT Ethernet management. The test instrument 110 may further include a plurality of USB ports 308, which may be USB-C ports, USB-A Interfaces, etc. The test instrument 110 may still further include an audio jack 310 that provides a direct audio interface by accepting, for instance, a 3 mm male plug. Each of the above-identified ports may be covered by a cover that may be movable between covering and open positions. Although not shown, the test instrument 110 may include, internal to the test instrument 110, a wireless network module to support wireless network communication, such as at 2.4 GHz and 5 GHz, and a Bluetooth module to support Bluetooth communication with an external device, such as a Bluetooth audio headset. The test instrument 110 may include a port 312, such as a QSFP DD port as well as additional types of ports, such as SFP-DD/SFPx, QSFPx, OSFP, etc.

Figure 4:
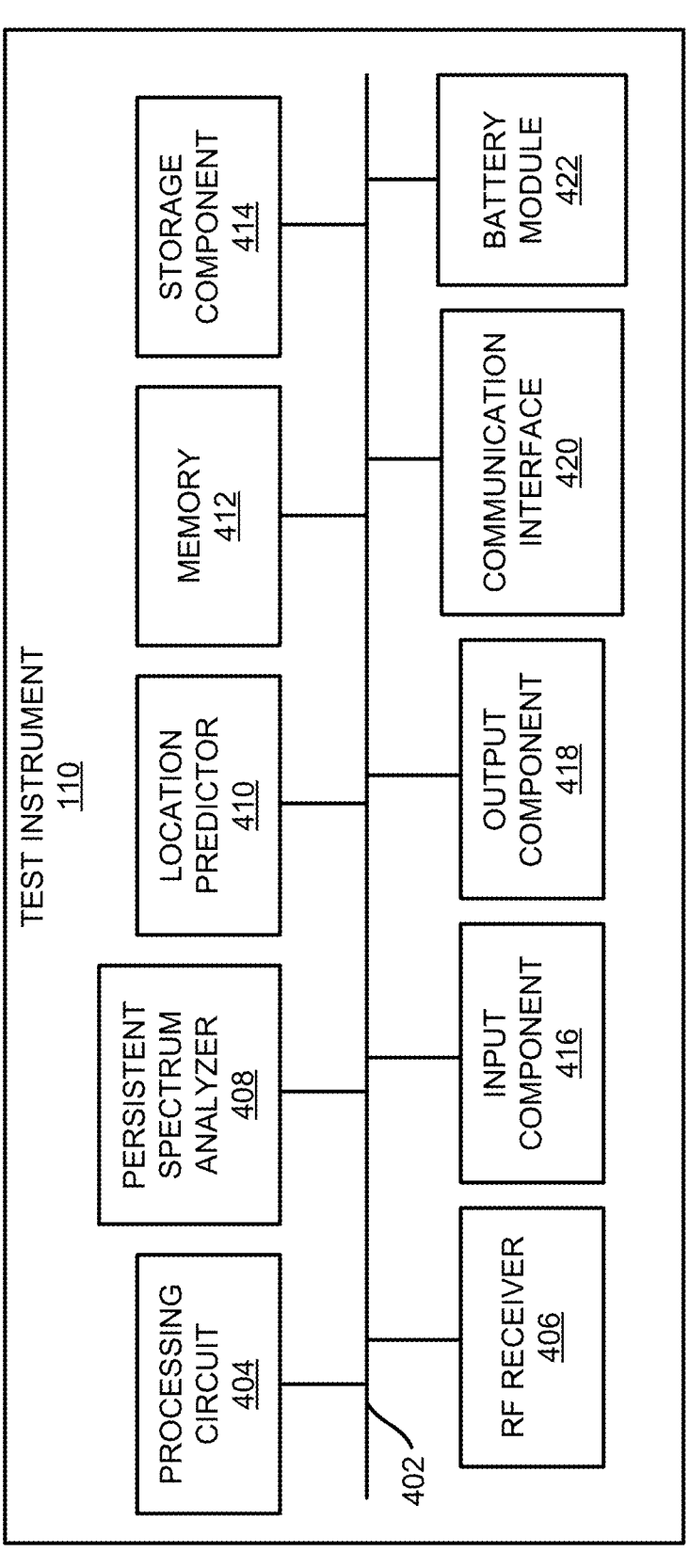
FIG. 4 is a block diagram of the test instrument depicted in FIGS. 1-3, in accordance with an example of the present disclosure.

FIG. 4 is a block diagram of the test instrument 110 depicted in FIGS. 1-3, according to an example of the present disclosure. As shown, the test instrument 110 may include a bus 402, a processing circuit 404, an RF receiver 406, a persistent spectrum analyzer 408, a location predictor 410, a memory 412, a storage component 414, an input component 416, an output component 418, a communication interface 420, and a battery module 422. The bus 402 may include a component that permits communication among the components of the test instrument 110.

The processing circuit 404 may be implemented in hardware, firmware, or a combination of hardware and software. The processing circuit 404 may include one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, the processing circuit 404 includes one or more processors capable of being programmed to perform a function. In some examples, the processing circuit 404 includes a combination of a FPGA and a microcontroller, in which the FPGA may perform certain operations and the microcontroller may perform other operations discussed herein. In some examples, the processing circuit 404 may execute instructions stored in the memory 412 in instances in which the processing circuit 404 includes a microcontroller. By way of particular example, the FPGA in the processing circuit 404 may perform various control operations and the microcontroller in the processing circuit 404 may perform determination and data storage operations.

The memory 412 may be a non-transitory computer readable medium, which may include RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

The RF receiver 406 may include hardware and/or software that may capture and process RF signals from the surrounding environment, e.g., the test environment 100. The RF receiver 406 may receive RF signals transmitted by other devices or systems in the test environment 100 including the interference source 108. The RF receiver 406 may convert the received RF signals into a form that the persistent spectrum analyzer 408 and the processing circuit 404 may process and utilize. The RF receiver 406 may include a radio receiver, a wireless communication receiver (which may enable wireless data transfer, voice communication, internet connectivity, and other wireless applications), and/or the like.

The persistent spectrum analyzer 408 may include hardware and/or software as is known in the art for measuring and displaying the spectrum of a channel. The persistent spectrum analyzer 408 may be specialized for analyzing and visualizing the frequency spectrum of the RF signals received by the RF receiver 406. For instance, the persistent spectrum analyzer 408 may measure the amplitude (power or voltage) of RF signals at different frequencies and display the results in a graphical format, e.g., as spectrum data, in which various power levels of the frequencies may be displayed using multiple colors. For instance, the persistent spectrum analyzer 408 may measure the power or voltage levels of the RF signals and display them in decibels (dB) on a vertical axis of the graph and the frequencies of the RF signals on the horizontal axis of the graph. In addition, the persistent spectrum analyzer 408 may perform sweeping by scanning a frequency range of interest and measuring the signal amplitudes at different frequencies. The amplitude measurement capability helps identify signal strength and analyze signal characteristics.

The location predictor 410 may include software and/or hardware that may estimate the location of an identified signal interference, e.g., the location of the interference source 108, if an interference signal is detected during an interference signal detection operation. The location predictor 410 may include machine readable instructions executed by the processing circuit 404 and/or other hardware. The estimation of the location of the interference source 108 following a determination that an interference signal has been detected may be based on geolocation techniques that may rely on received signal strength (RSS), power difference of arrival (PDOA), and/or other parameters. Examples of the geolocation techniques include: Angle of Arrival (AOA), which measures propagation direction of a signal (array antenna required); Time of Arrival (TOA)/Time Difference of Arrival (TDOA), which measures absolute time or time differences; Frequency Difference of Arrival (FDOA), which uses Doppler shift; and RSS)/PDOA, which measures and uses a path loss model. In an example, the location predictor 410 may include the EagleEye software provided by Viavi™. The location predictor 410 may further include mapping software that provides visual and/or voice prompts to guide technicians to the suspected area of interference. For instance, the location predictor 410 may display locations and strengths of interference sources in a heat map.

The storage component 414 may store information and/or software related to the operation and use of test instrument 110. For example, the storage component 414 may include a hard disk (e.g., a magnetic disk, solid state disk, etc.) and/or another type of non-transitory computer-readable medium.

The input component 416 may include a component that permits the test instrument 110 to receive information, such as via user input (e.g., a touch screen display, a keyboard, a keypad, a mouse, a button, a switch, and/or a microphone). Additionally, or alternatively, the input component 416 may include a sensor for sensing information (e.g., a GPS component, an accelerometer, a gyroscope, and/or an actuator). The output component 418 may include a component that provides output information from the test instrument 110 (e.g., a display 202, a speaker 206, a user interface, and/or one or more light-emitting diodes (LEDs)). By way of example, the output component 418 may include a display 202 that may provide a graphical user interface (GUI) through which a user 104 may interact with the test instrument 110. The input component 416 and the output component 418 may be combined into a single component, such as a touch responsive display, also known as a touchscreen.

The communication interface 420 may include a transceiver-like component (e.g., a transceiver and/or a separate receiver and transmitter) that enables the test instrument 110 to communicate with other devices, such as via a wired connection, a wireless connection, or a combination of wired and wireless connections. The communication interface 420 may permit the test instrument 110 to receive information from another device and/or provide information to another device. For example, the communication interface 420 may include an Ethernet interface, an optical interface, a coaxial interface, an infrared interface, an RF interface, a universal serial bus (USB) interface, a Wi-Fi interface, a cellular network interface, and/or the like.

The battery module 422 is connected along the bus 402 to supply power to the processing circuit 404, the RF receiver 406, the persistent spectrum analyzer 408, the location predictor 410, the memory 412, and other components of the test instrument 110. The battery module 422 may supply power during field measurements by the test instrument 110, which may enable the test instrument 110 to be a portable.

Figure 5:
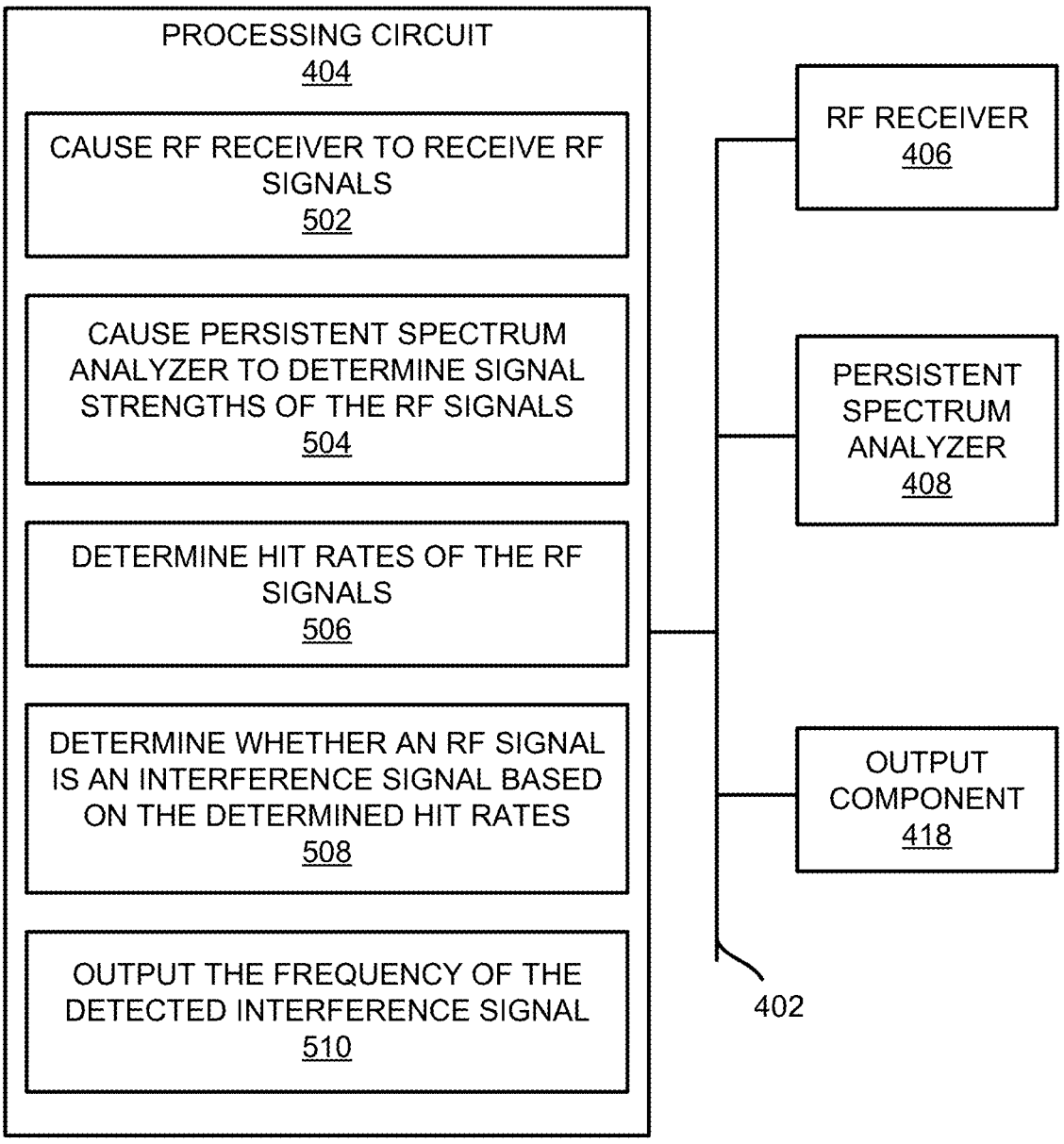
FIG. 5 depicts a block diagram of various components of the test instrument depicted in FIGS. 1-4, according to an example of the present disclosure.

FIG. 5 depicts a block diagram of various components of the test instrument 110 depicted in FIGS. 1-4, according to an example of the present disclosure. As shown in FIG. 5, the processing circuit 404 may be programmed with instructions 500-510 that the processing circuit 404 may execute. The instructions 500-510 may be stored on the memory 412 and/or the storage component 414.

As shown, the processing circuit 404 may execute the instructions 502 to cause the RF receiver 406 to receive RF signals across a range of frequencies. The range of frequencies may include frequencies that may be known to or may be likely to interfere with certain types of UEs 106.

The processing circuit 404 may execute the instructions 504 to cause the persistent spectrum analyzer 408 to determine signal strengths (e.g., amplitudes) of the received RF signals across the range of frequencies. For instance, the persistent spectrum analyzer 408 may sweep across the range of frequencies by scanning the frequency range and measuring the signal amplitudes at different frequencies. According to examples, the persistent spectrum analyzer 408 may cause a persistent spectrum that shows the measured signal amplitudes as a function of the different frequencies to be displayed on the output component 418, e.g., the display 202.

Figure 6:
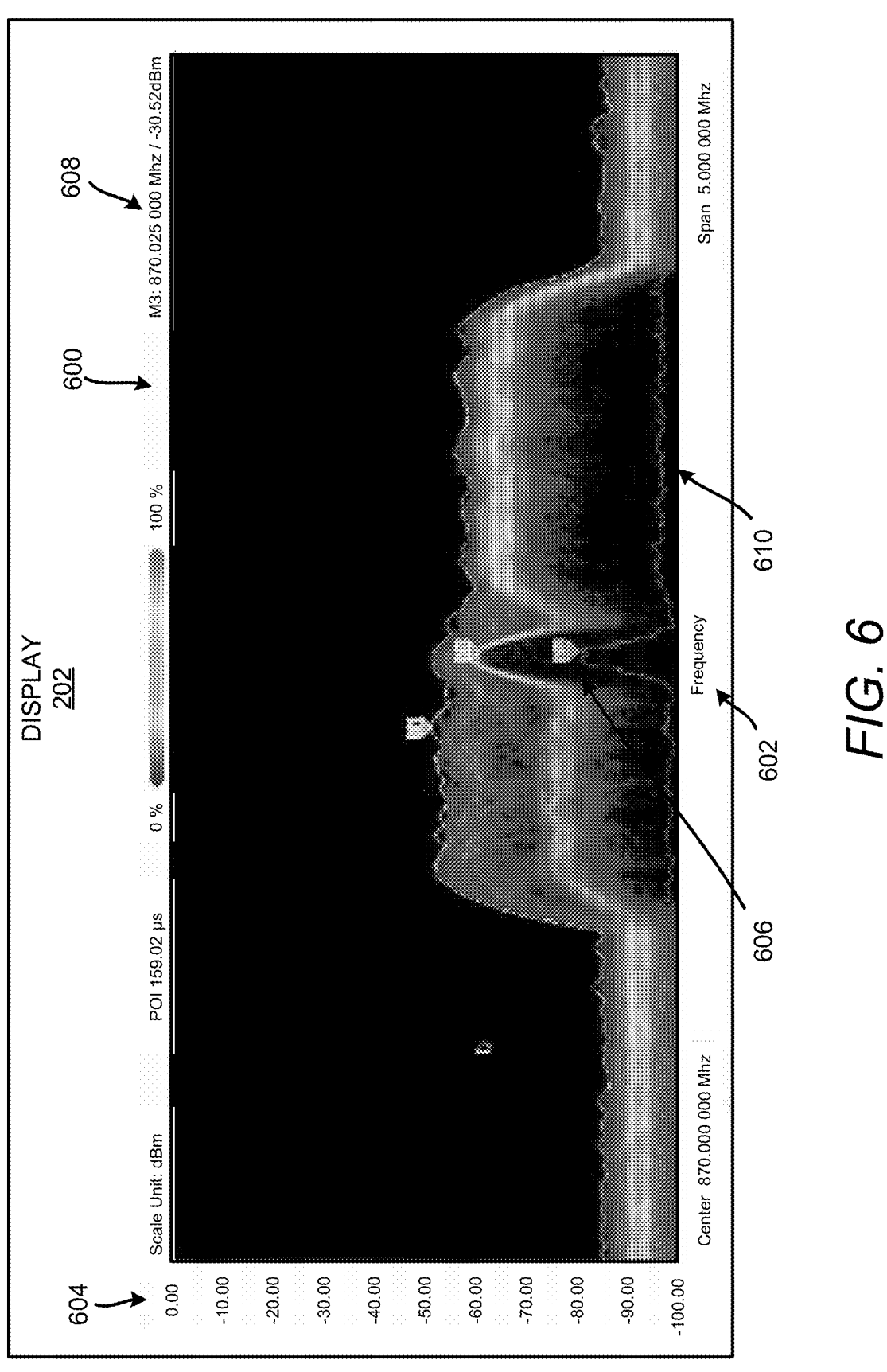
FIG. 6 illustrates a persistent spectrum that displays spectrum data corresponding to a frequency of an interference signal detected from a hit rate of the interference signal, according to an example of the present disclosure.

An example of a persistent spectrum 600 that shows the measured signal amplitudes displayed on a display 202 is shown in FIG. 6. The persistent spectrum 600 may be defined as a visual representation of a spectrum of frequencies of RF signals and their measured amplitudes. As shown, the persistent spectrum 600 includes an x-axis 602, which represents the frequencies of the received RF signals and a y-axis 604, which represents the amplitudes (signal power levels) in decibel-milliwatts (dBm). As shown, the RF receiver 406 may receive a number of RF signals for each signal frequency and the persistent spectrum 600 may display the densities of the frequencies at the power levels using various colors. By way of particular example, the RF receiver 406 may receive approximately 1500 RF signal samples at each of the frequencies across the range of frequencies and the persistent spectrum analyzer 408 may determine the signal power levels of the samples. The persistent spectrum analyzer 408 may also determine densities of the signal power levels and may display the densities using various colors. For instance, a red color may denote a relatively high density and a blue color may represent a relatively low density.

The processing circuit 404 may execute the instructions 506 to determine respective hit rates of the RF signals from the determined signal strengths of the RF signals. Particularly, for instance, the processing circuit 404 may determine respective numbers of times (counts or hits) that the RF signals are received per a total number of iterations. By way of particular example, the processing circuit 404 may determine the hit rate for an RF signal through the following procedure.

The processing circuit 404 may transform the RF signal that has been captured at a specific moment into frequency domain data using, for instance, a fast Fourier transform (FFT). The processing circuit 404 may then increase a value in a specific position of a 2D table by a certain amount, in which the 2D table lists RF signals and a count of times that the RF signals were received. Initially, all of the values in the 2D table may be set to 0. The processing circuit 404 may repeat these steps for a specific period of time such that the values in the 2D table represent the hit counts of the RF signals. The processing circuit 404 may then use the hit count to calculate the hit rate of the RF signal, e.g., the hit rate of an RF signal equals the hit count/total number of iterations of that RF signal.

The processing circuit 404 may execute the instructions 508 to determine whether an RF signal is an interference signal based on the respective hit rates of the RF signals. In other words, the processing circuit 404 may determine whether any of the RF signals corresponds to an unwanted energy emission that may affect communications of the UE 106 with the cell site 102. The processing circuit 404 may also execute the instructions 508 to detect that a certain RF signal of the RF signals is an interference signal based on the respective hit rates of the RF signals.

According to examples, the 2D table and/or information contained in the 2D table may be presented to a user, who may determine which of the RF signals have high or the highest hit rates. For instance, interference signals, such as continuous wave (CW) signals, may easily be distinguished from modulation signals or noise because they exhibit a high hit rate at specific frequencies and power levels. This distinctive characteristic may allow users to easy differentiate the interference signals from other signals or noise. In some examples, in order to cover certain exceptional cases, an internal threshold may be applied to filter out signals that are not interference. This may be a tuning aspect that may be considered during product development. In these examples, the user may input an indication that a certain RF signal is likely an interference signal to the processing circuit 404.

According to examples, to detect that the certain RF signal is an interference signal, the processing circuit 404 may, for each of the RF signals across the range of frequencies, determine whether the hit rate of the RF signal exceeds a predetermined threshold from a baseline. The processing circuit 404 may also, based on a determination that the hit rate of the respective frequency exceeds the predetermined threshold from the baseline, determine that the RF signal is an interference signal. The baseline may be a moving baseline and may be determined from the RF signals, e.g., the average hit counts of the RF signals in the 2D table.

According to examples, to detect that the certain RF signal is an interference signal, the processing circuit 404 may detect an RF signal that has a hit rate that exceeds, by more than a predetermined threshold, hit rates of RF signals in a certain span of RF signal frequencies from a frequency of the RF signal. The certain span of RF signal frequencies may be signal frequencies that are neighboring signal frequencies of the certain signal frequency. The size of the certain span may be user-defined, based on historical data, based on analysis by an artificial intelligence technique, and/or the like.

The processing circuit 404 may also determine that the detected RF signal is an interference signal based on the detected RF signal having a hit rate that exceeds the hit rates of RF signals in the certain span of RF signal frequencies from the RF signal by more than the predetermined threshold. According to examples, the predetermined threshold may be user-defined, based on historical data, determined through artificial intelligence techniques, and/or the like.

The processing circuit 404 may execute the instructions 510 to output the frequency of the detected interference signal. The processing circuit 404 may output the frequency of the detected interference signal by causing the display 202 to display the detected interference signal 606 in the persistent spectrum 600. In addition, the processing circuit 404 may determine a signal power level of the detected interference signal from the determined signal strengths of the RF signals. The processing circuit 404 may also cause the determined signal power level 608 of the detected interference signal to be displayed with the persistent spectrum 600 as shown in FIG. 6.

As also shown in in FIG. 6, spectrum data corresponding to the determined hit rates of the RF signals to be displayed on the display 202. An example of the spectrum data (trace 610) corresponding to the determined hit rates of the RF signals is shown in FIG. 6.

According to examples, the processing circuit 404 may perform additional signal analysis to determine a location of a source of the interference signal so that the interference source may be resolved or removed.

Figure 7:
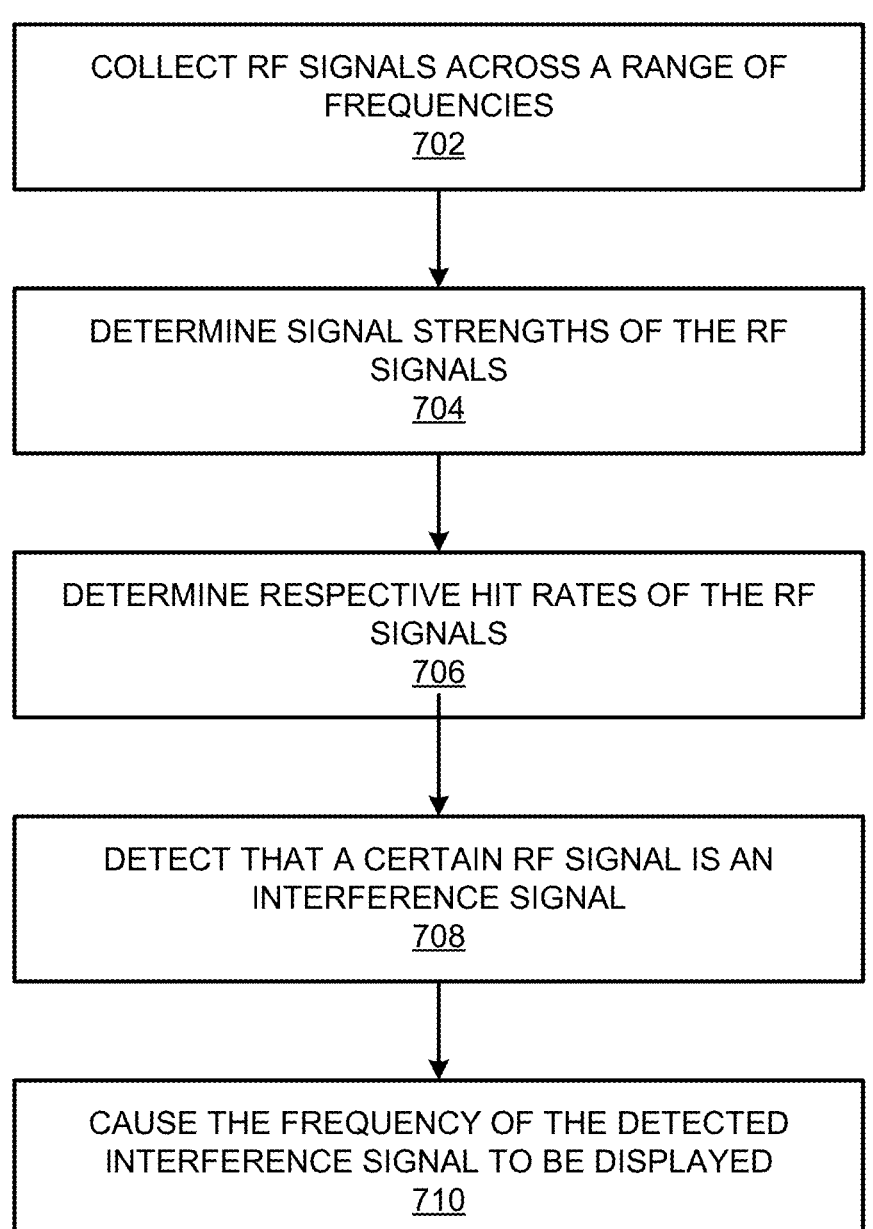
FIG. 7 illustrates a flow diagram of a method for RF interference hunting, according to an example of the present disclosure.

Various manners in which the processing circuit 404 of the test instrument 110 may operate are discussed in greater detail with respect to the method 700 depicted in FIG. 7. Particularly, FIG. 7 illustrates a flow diagram of a method 700 for RF interference hunting, according to an example of the present disclosure. It should be understood that the method 700 may include additional operations and that some of the operations described therein may be removed and/or modified without departing from the scope of the method 700. The description of the method 700 is made with reference to the features depicted in FIGS. 1-6 for purposes of illustration.

At block 702, RF signals across a range of frequencies may be collected. For instance, the processing circuit 404 may cause the RF receiver 406 to receive the RF signals as discussed herein.

At block 704, signal strengths of the RF signals across the range of frequencies may be determined. For instance, the processing circuit 404 may cause the persistent spectrum analyzer 408 to determine the signal strengths of the RF signals across the range of frequencies as discussed herein.

At block 706, the processing circuit 404 may determine respective hit rates of the RF signals from the determined signal strengths of the RF signals; In addition, at block 708, the processing circuit 404 may detect that a certain RF signal is an interference signal based on the respective hit rates of the RF signals. The processing circuit 404 may detect the interference signal in any of the manners as described herein.

At block 710, the processing circuit 404 may cause the frequency of the detected interference signal to be displayed on a display 202. As discussed herein, spectrum data corresponding to the detected interference signal 606 may be displayed on a persistent spectrum 600 of the RF signal frequencies and amplitudes. The persistent spectrum 600 may also depict the signal power level 608 of the detected interference signal on the display 202. Furthermore, the persistent spectrum 600 may display a trace 610 of the determined hit rates of the RF signals.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A test instrument comprising:
a radio frequency (RF) receiver to receive RF signals across a range of frequencies;
a persistent spectrum analyzer to determine signal strengths of the RF signals across the range of frequencies; and
a processing circuit to:
determine respective hit rates of the RF signals from the determined signal strengths of the RF signals;
detect that a certain RF signal of the RF signals is an interference signal based on the respective hit rates of the RF signals, the interference signal having a frequency; and
output the frequency of the interference signal.

2. The test instrument of claim 1, wherein the processing circuit is to:
determine a signal power level of the interference signal from the determined signal strengths of the RF signals; and
output the determined signal power level of the interference signal.

3. The test instrument of claim 2, further comprising:
a display; and
wherein to output the frequency of the interference signal, the processing circuit is to:
cause spectrum data corresponding to the interference signal and the determined hit rates of the RF signals to be displayed on the display.

4. The test instrument of claim 3, wherein the processing circuit is to:
cause the determined signal power level of the interference signal to displayed on the display.

5. The test instrument of claim 3, wherein the processing circuit is to further cause spectrum data corresponding to the signal strengths of the RF signals across the range of frequencies to be displayed on the display with the spectrum data corresponding to the interference signal.

6. The test instrument of claim 1, wherein, to detect that the certain RF signal is an interference signal, the processing circuit is to:
for each of the RF signals across the range of frequencies, determine whether the hit rate of the RF signal exceeds a predetermined threshold from a baseline; and
based on a determination that the hit rate of the frequency exceeds the predetermined threshold from the baseline, determine that the RF signal is an interference signal.

7. The test instrument of claim 1, wherein, to detect that the certain RF signal is an interference signal, the processing circuit is to:
detect an RF signal that has a hit rate that exceeds, by more than a predetermined threshold, hit rates of RF signals in a certain span of RF signal frequencies from a frequency of the RF signal; and
determine that the detected RF signal is an interference signal based on the detected RF signal having a hit rate that exceeds the hit rates of RF signals in the certain span of RF signal frequencies from the RF signal by more than the predetermined threshold.

8. The test instrument of claim 7, wherein the predetermined threshold is one of user-defined, based on historical data, or determined through artificial intelligence techniques.

9. The test instrument of claim 7, wherein the certain span comprises a span of RF signals that is user-defined, based on historical data, or determined through artificial intelligence techniques.

10. A method for radio frequency (RF) interference hunting comprising:

collecting RF signals across a range of frequencies;

determining signal strengths of the RF signals across the range of frequencies;

determining, by a processing circuit, respective hit rates of the RF signals from the determined signal strengths of the RF signals;

detecting, by the processing circuit, that a certain RF signal is an interference signal based on the respective hit rates of the RF signals, the interference signal having frequency; and causing, by the processing circuit, the frequency of the interference signal to be displayed on a display.

11. The method of claim 10, further comprising:

determining a signal power level of the interference signal from the determined signal strengths of the RF signals; and causing the determined signal power level of the interference signal on the display.

12. The method of claim 10, further comprising:

causing spectrum data corresponding to the interference signal and the determined hit rates of the RF signals to be displayed on the display.

13. The method of claim 12, further comprising:

causing spectrum data corresponding to the signal strengths of the RF signals across the range of frequencies to be displayed on the display with the spectrum data corresponding to the interference signal.

14. The method of claim 10, wherein, to detect that the certain RF signal is an interference signal, the method further comprises:

for each of the RF signals across the range of frequencies, determining whether the hit rate of the RF signal exceeds a predetermined threshold from a baseline; and based on a determination that the hit rate of the frequency exceeds the predetermined threshold from the baseline, determining that the RF signal is an interference signal.

15. The method of claim 10, wherein, to detect that the certain RF signal is an interference signal, the method further comprises:

detecting an RF signal that has a hit rate that exceeds, by more than a predetermined threshold, hit rates of RF signals in a certain span of RF signal frequencies from a frequency of the RF signal; and determining that the detected RF signal is an interference signal based on the detected RF signal having a hit rate that exceeds the hit rates of RF signals in the certain span of RF signal frequencies from the RF signal by more than the predetermined threshold.

16. The method of claim 15, wherein the predetermined threshold is one of user-defined, based on historical data, or determined through artificial intelligence techniques.

17. A test instrument comprising:

a radio frequency (RF) receiver to receive RF signals across a range of frequencies;

a persistent spectrum analyzer to determine signal strengths of the RF signals across the range of frequencies;

a display; and a processing circuit to:

determine respective hit rates of the RF signals from the determined signal strengths of the RF signals;

detect that a certain RF signal of the RF signals is an interference signal based on the respective hit rates of the RF signals; and cause spectrum data corresponding to the interference signal to be displayed on the display.

18. The test instrument of claim 17, wherein the processing circuit is to:

determine a signal power level of the interference signal from the determined signal strengths of the RF signals; and cause the determined signal power level of the interference signal to be displayed on the display.

19. The test instrument of claim 17, wherein, to detect that the certain RF signal is an interference signal, the processing circuit is to:

for each of the RF signals across the range of frequencies, determine whether the hit rate of the RF signal exceeds a predetermined threshold from a baseline; and based on a determination that the hit rate of the frequency exceeds the predetermined threshold from the baseline, determine that the RF signal is an interference signal.

20. The test instrument of claim 17, wherein, to detect that the certain RF signal is an interference signal, the processing circuit is to:

detect an RF signal that has a hit rate that exceeds, by more than a predetermined threshold, hit rates of RF signals in a certain span of RF signal frequencies from a frequency of the RF signal; and determine that the detected RF signal is an interference signal based on the detected RF signal having a hit rate that exceeds the hit rates of RF signals in the certain span of RF signal frequencies from the RF signal by more than the predetermined threshold.

* * * * *